(12) United States Patent
Cook (10) Patent No.: US 12,101,592 B2
(45) Date of Patent: Sep. 24, 2024

(54) BONE CONDUCTION HEARING AID FOR CANINES

(71) Applicant: Elizabeth W. Cook, Rochester, NY (US)

(72) Inventor: Elizabeth W. Cook, Rochester, NY (US)

(*) Notice: Subject to any disclaimer, the term of this patent is extended or adjusted under 35 U.S.C. 154(b) by 25 days.

(21) Appl. No.: 18/122,247

(22) Filed: Mar. 16, 2023

(65) Prior Publication Data

US 2023/0300513 A1  Sep. 21, 2023

Related U.S. Application Data (60) Provisional application No. 63/321,161, filed on Mar. 18, 2022.

(51) Int. Cl.
*A01K 27/00* (2006.01)
*H04R 1/10* (2006.01)

(52) U.S. Cl.
CPC ........... *H04R 1/105* (2013.01); *A01K 27/001* (2013.01); *A01K 27/002* (2013.01); *H04R 1/1066* (2013.01); *H04R 1/1025* (2013.01); *H04R 2420/07* (2013.01); *H04R 2460/13* (2013.01)

(58) Field of Classification Search
CPC .. A01K 27/001; A01K 27/002; A01K 15/021; H04R 1/105; H04R 1/1066
See application file for complete search history.

(56) References Cited

U.S. PATENT DOCUMENTS

| | | |
|---|---|---|
| 4,918,757 A | 4/1990 | Janssen et al. |
| 4,982,434 A | 1/1991 | Lenhardt et al. |
| 5,447,489 A | 9/1995 | Issalene et al. |
| 5,706,251 A | 1/1998 | May |
| 7,822,215 B2 | 10/2010 | Carazo et al. |
| 8,325,963 B2 | 12/2012 | Kimura |
| 8,929,575 B2 | 1/2015 | Norris |
| 9,510,115 B2 | 11/2016 | Bern |
| 10,173,026 B2 | 1/2019 | Smith et al. |
| 10,284,982 B1 | 5/2019 | Lewin Jessen et al. |
| 10,843,006 B2 | 11/2020 | Malchano et al. |
| 10,887,681 B1 | 1/2021 | Wen |
| 2005/0201574 A1 | 9/2005 | Lenhardt |
| 2008/0168952 A1* | 7/2008 | Morehead ............ A01K 27/006 119/859 |
| 2010/0040249 A1 | 2/2010 | Lenhardt |
| 2010/0179389 A1* | 7/2010 | Moroney, III ....... A61B 5/6819 119/857 |
| 2021/0105554 A1* | 4/2021 | McRae ................ H04R 29/001 |
| 2022/0130362 A1* | 4/2022 | Washburn ............ G10K 11/168 |

* cited by examiner

*Primary Examiner* — Yvonne R Abbott-Lewis
(74) *Attorney, Agent, or Firm* — Michael J. Nickerson (57) ABSTRACT

A restraint device for assisting hearing in an animal includes a first strap configured to encircle a thorax area of the animal and a bone conduction device for producing vibration near a bone in the thorax area of the animal. The bone conduction device includes a bone conduction transducer configured to generate vibrations in a frequency range perceivable by the animal, a processor configured to control the generation of vibrations by said bone conduction transducer, and a microphone configured to pick up ambient sounds and convert the picked up ambient sounds to electrical signals. The processor controls the bone conduction transducer to generate vibrations in a frequency range corresponding to the picked up ambient sounds.

20 Claims, 10 Drawing Sheets

BONE CONDUCTION HEARING AID FOR CANINES

PRIORITY INFORMATION

The present application claims priority, under 35 U.S.C. § 119(e), from U.S. Provisional Patent Application Ser. No. 63/321,161, filed on Mar. 18, 2022. The entire content of U.S. Provisional Patent Application Ser. No. 63/321,161, filed on Mar. 18, 2022, is hereby incorporated by reference.

BACKGROUND

Bone conduction is the conduction of sound to the inner ear through the bones of a user.

Examples of conventional bone conduction devices are disclosed in U.S. Pat. Nos. 4,918,757; 4,982,434; 5,447,489; 5,706,251; 7,822,215; 8,325,963; 9,510,115; 10,173,026; 10,284,982; 10,843,006; and 10,887,681. The entire contents of U.S. Pat. Nos. 4,918,757; 4,982.434; 5,447,489; 5,706,251; 7,822,215; 8,325,963; 9,510,115; 10,173,026; 10,284,982; 10,843,006; and 10,887,681 are hereby incorporated by reference.

Other examples of conventional bone conduction devices are disclosed in Published US Patent Application Numbers 2005/0201574 and 2010/0040249. The entire contents of Published US Patent Application Numbers 2005/0201574 and 2010/0040249 are hereby incorporated by reference.

However, conventional bone conduction devices have been designed for human use.

Thus, it is desirable to provide a bone conduction device to assist the hearing of an animal.

Furthermore, it is desirable to provide a bone conduction collar that positions the bone conduction device to effectively assist the hearing of an animal.

Lastly, it is desirable to provide a bone conduction collar that positions the bone conduction device near the cranium or a bone or a bone of an animal to effectively assist the hearing of the animal.

BRIEF DESCRIPTION OF THE DRAWINGS

The drawings are only for purposes of illustrating various embodiments and are not to be construed as limiting, wherein.

DETAILED DESCRIPTION OF THE DRAWINGS

For a general understanding, reference is made to the drawings. It is noted that the drawings may not have been drawn to scale and that certain regions may have been purposely drawn disproportionately so that the features and concepts may be properly illustrated.

Figure 1:
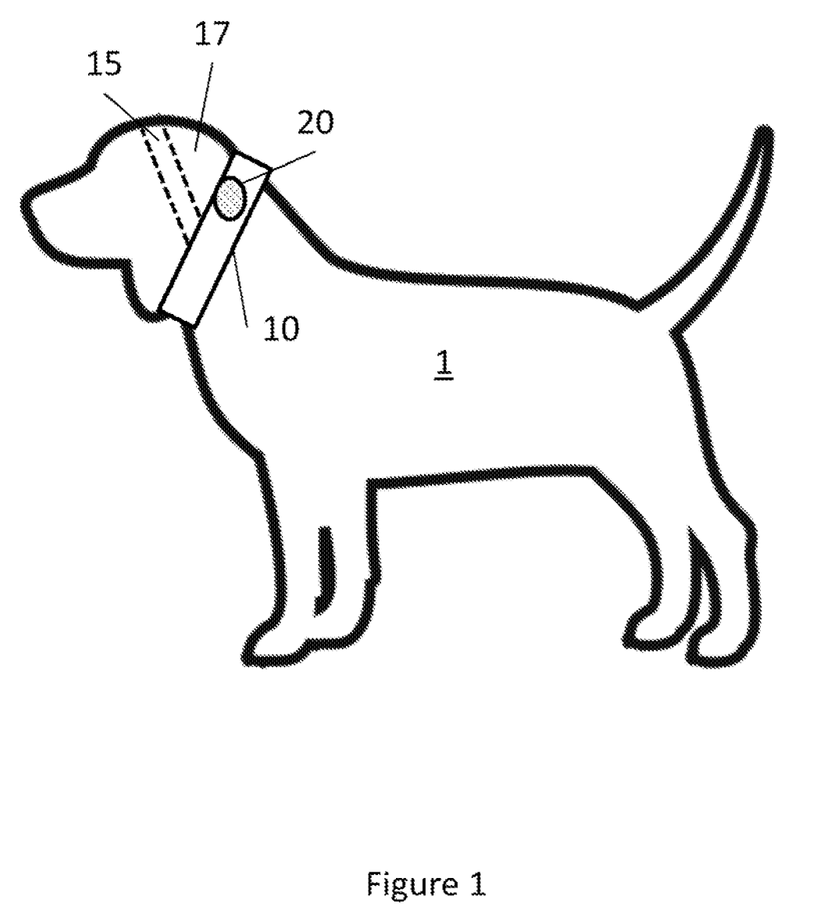
FIG. 1 illustrates a bone conduction collar for assisting hearing in an animal.

FIG. 1 illustrates a restraint device for assisting hearing in an animal. As illustrated in FIG. 1, the restraint device includes a first strap 10 that is able to encircle the thorax area of a dog 1. The first strap 10 includes a bone conduction device 20 that is positioned near the cranium or a bone of the dog 1.

The bone conduction collar may also include a second strap 15 for going over the head of the dog 1 to assist in maintaining the bone conduction collar on the dog 1.

The first strap 10 and the second strap 15 form an opening 17 that allows the ears (not shown) of the dog 1 to pass therethrough. The second strap 15 is positioned near the front or the top of the cranium or a bone of the dog 1. The first strap 10 is positioned near the back or the bottom of the cranium or a bone of the dog 1.

Although FIG. 1 illustrates that bone conduction device 20 is located on the first strap 10, it may be located on the second strap 15.

Figure 2:
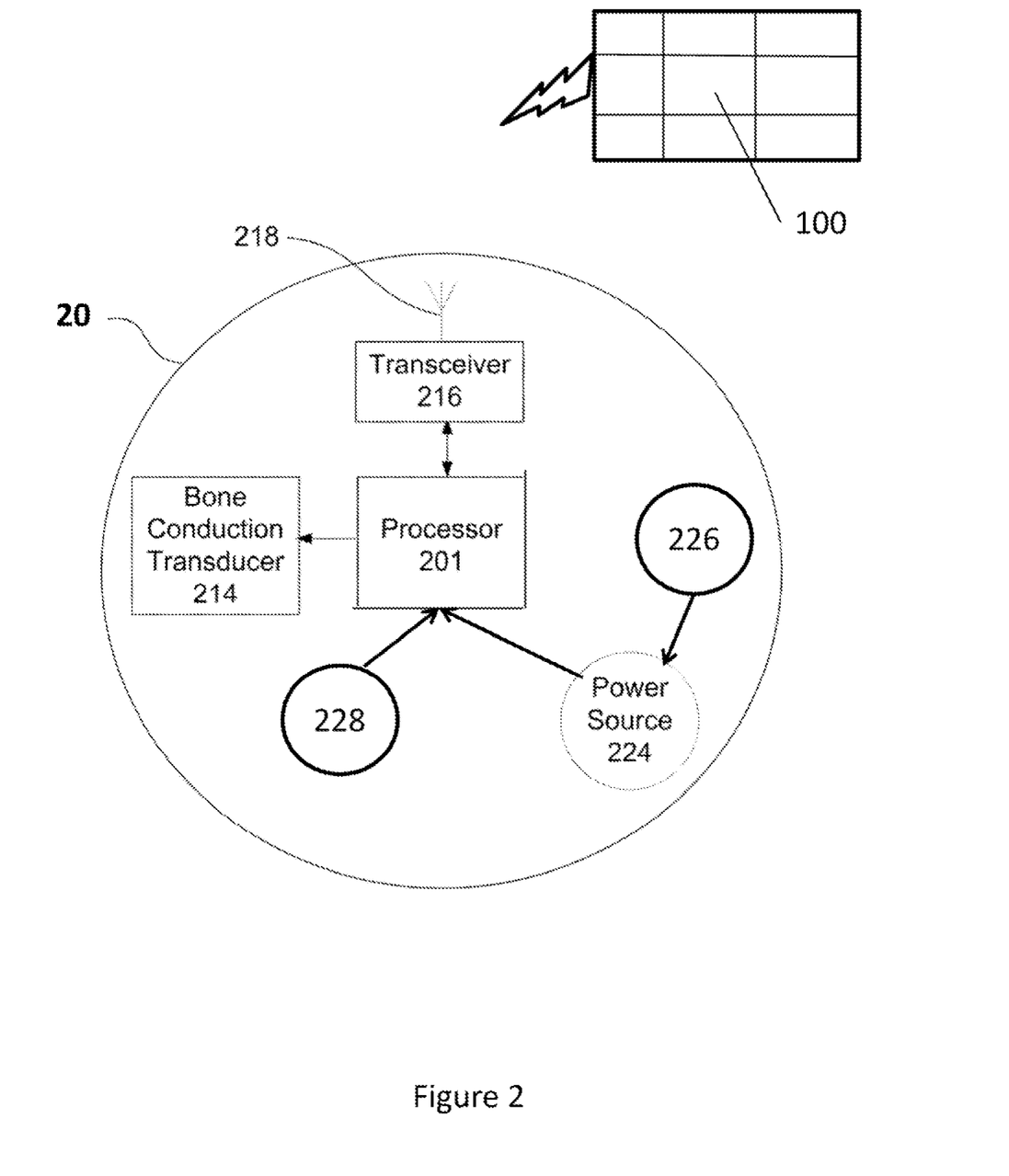
FIG. 2 is a block diagram illustrating different components included within a bone conduction device of a bone conduction collar.

FIG. 2 is a block diagram illustrating different components included within a bone conduction device. As Illustrated in FIG. 2, the bone conduction device 20 includes an antenna 218 configured to transmit and receive wireless signals according to the wavelength appropriate to use with the selected wireless transmission protocol.

In some implementations, the antenna 218 may be formed from an elongated strip of metal. For example, the antenna 218 may be in the shape of a coil.

The bone conduction device 20 further includes a transceiver 216 communicatively coupled to the antenna 218. The transceiver 216 may be configured to convert transducer control signals received by the antenna 218, from remote device 100, into a form suitable for being used by a bone conduction transducer 214.

The transceiver 216 allows a person to remotely give non-verbal commands to the canine through the sending of wireless transducer control signals by the remote device 100.

For example, a person may have a remote device 100 that upon activating a certain button, transducer control signals are sent to the bone conduction device 20 to generate a vibration that the canine perceives as being a command to sit.

The remote device 100 may be a smartphone or smart device, with Bluetooth™ capability, that transmits the wireless transducer control signals to the bone conduction device 20.

As noted above, the bone conduction device 20 further includes a bone conduction transducer 214 communicatively coupled to a processor 201. The bone conduction transducer 214 may include a device capable of vibrating in response to receiving an electrical control signal. For instance, the bone conduction transducer 214 may include a piezoelectric crystal or other piezoelectric material capable of generating vibrations in the frequency range that is perceivable by the animal. Other transducers capable of generating vibrations in response to an electrical control signal may be used.

In some implementations, the bone conduction transducer 214 is anchored to the enclosure of the bone conduction device 20 such that the vibration generated from the transducer 214 is transferred to the enclosure, and then from the enclosure to the animal when the bone conduction device 20, via the bone conduction collar, is attached to the animal.

In some implementations, multiple bone conduction transducers 214 may be included within the enclosure to enhance the strength of the vibrations produced by the bone conduction device 20. In such case, the bone conduction control signals are sent in phase from the processor 201 to each one of the bone conduction transducers 214.

The bone conduction device 20 further includes a microphone 228 which is operatively connected to the processor 201. The microphone 228 picks up ambient sounds and converts the ambient sounds to electrical signals which are used by the processor 201 to control the transducer 214. The transducer 214 conveys the ambient sounds via bone conduction to assist the animal in perceiving the ambient sounds.

The bone conduction device 20 further includes a power source 224. The power source 224 is operatively coupled to the transceiver 216, the bone conduction transducer 214, the local processor 201, and the microphone 228. In some implementations, the power source 224 includes a battery, such as a lithium ion battery. In some implementations, the power source 224 may be rechargeable.

For example, the power source 224 may include a battery that is coupled to a charging port 226, such as a universal serial bus (USB) or a micro-USB port. The battery then may be recharged by connecting the charging port to an external power supply through a cable adapted to couple to the charging port 226.

In another example, the battery may be recharged though motion of the bone conduction device 20. This type of recharging, also known as self-charging or "power through movement technology," transforms kinetic energy into power. Thus, when an animal wearing the bone conduction device 20 moves around (e.g., by walking, jumping or other movement that causes the bone conduction device 20 to move as well), the battery will convert some of the kinetic energy of the animal into power that is used to recharge itself. The self-charging battery may include a rotating pendulum, gear, and micro-electrical generator.

Alternatively, or in addition, the self-charging battery may be based on electromagnetic induction. For example, the self-charging battery may include a moveable magnet within the enclosure that shifts position relative to a wire coil as an animal moves with the bone conduction device 20. The motion of the magnet past the coil generates electrical current within the coil that can be used to recharge the battery. In some implementations, the antenna 218 may also be used as the coil for recharging the battery.

In some implementations, the power source 224 may be recharged wirelessly. For instance, the power source 224 may include a battery that can be recharged through resonant magnetic coupling. In an example, the bone conduction device 20 may include a coil (which can double as the antenna 218) coupled to the battery that, when situated near an oscillating magnetic field emanating from a base power supply station, couples to the magnetic field at a resonance frequency.

The resonance coupling may result in the generation of electrical current within the coil located in the bone conduction device 20, where the newly generated electrical current may be used to recharge the battery.

It is further noted that the bone conduction device 20 may receive a wireless signal (such as a Bluetooth™ signal) that instructs the bone conduction device 20 to cause the transducer 214 to produce vibrations that represents to the animal a command such that a user can convey a silent (non-audible) command to the animal.

Figure 3:
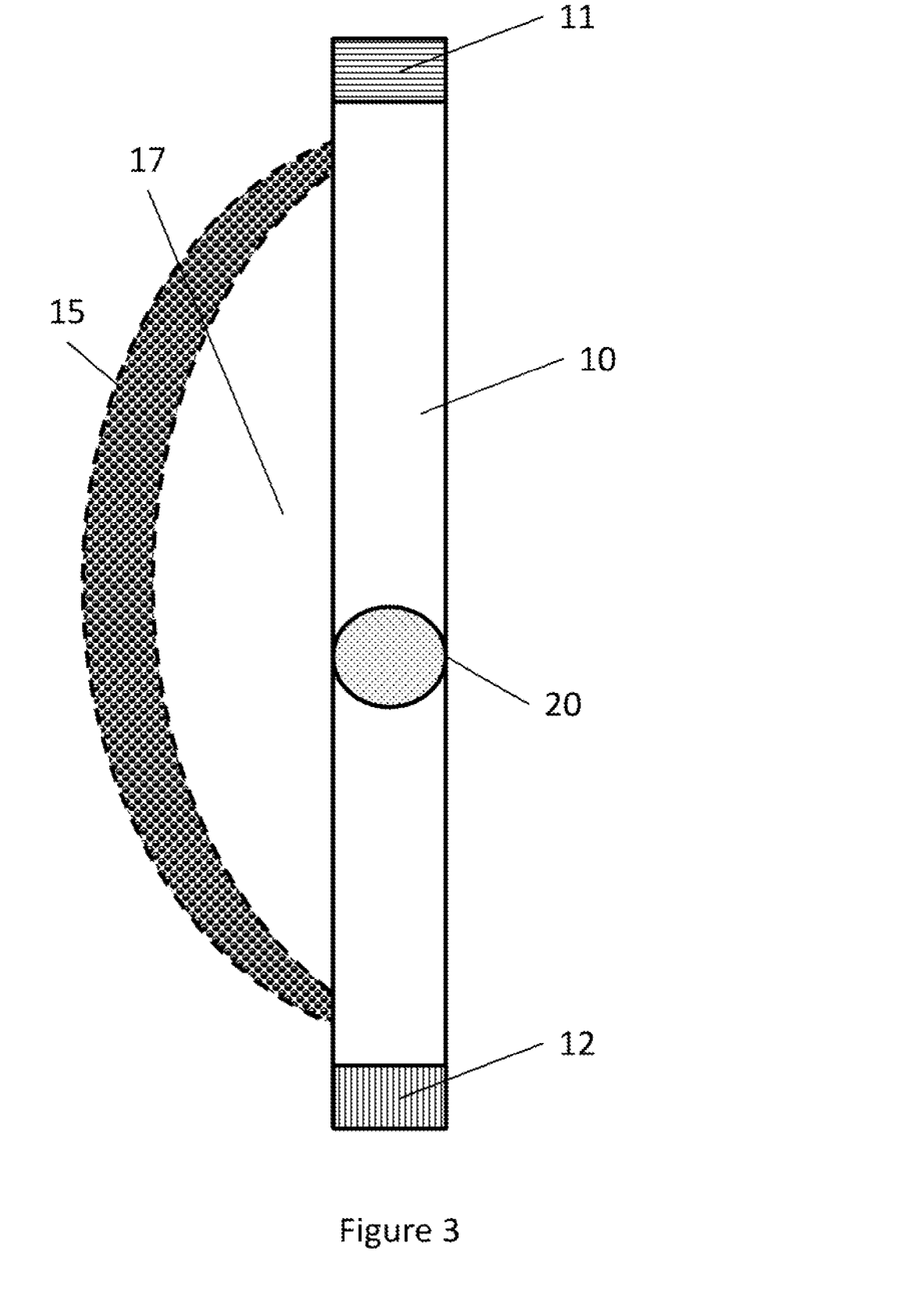
FIG. 3 illustrates a hearing assist restraint device for an animal.

FIG. 3 illustrates a restraint device for an animal for assisting hearing in an animal. As illustrated in FIG. 3, the restraint device includes a first strap 10 that is able to encircle the thorax area of an animal. The first strap 10 includes a bone conduction device 20 that is positioned near the cranium or a bone of the animal.

The first strap 10 also includes attachment devices (interfaces) 11 and 12 to enable the first strap 10 encircle the thorax area of an animal. The attachment devices (interfaces) 11 and 12 may be a hook and latch system, a buckle system, or a snap system.

The bone conduction collar may also include a second strap 15 for going over the head of the animal to assist in maintaining the bone conduction collar on the animal.

The first strap 10 and the second strap 15 form an opening 17 that allows the ears (not shown) of the animal to pass therethrough. The second strap 15 is positioned near the front or the top of the cranium or a bone of the animal. The first strap 10 is positioned near the back or the bottom of the cranium or a bone of the animal.

Although FIG. 3 illustrates that bone conduction device 20 is located on the first strap 10, it may be located on the second strap 15.

Figure 4:
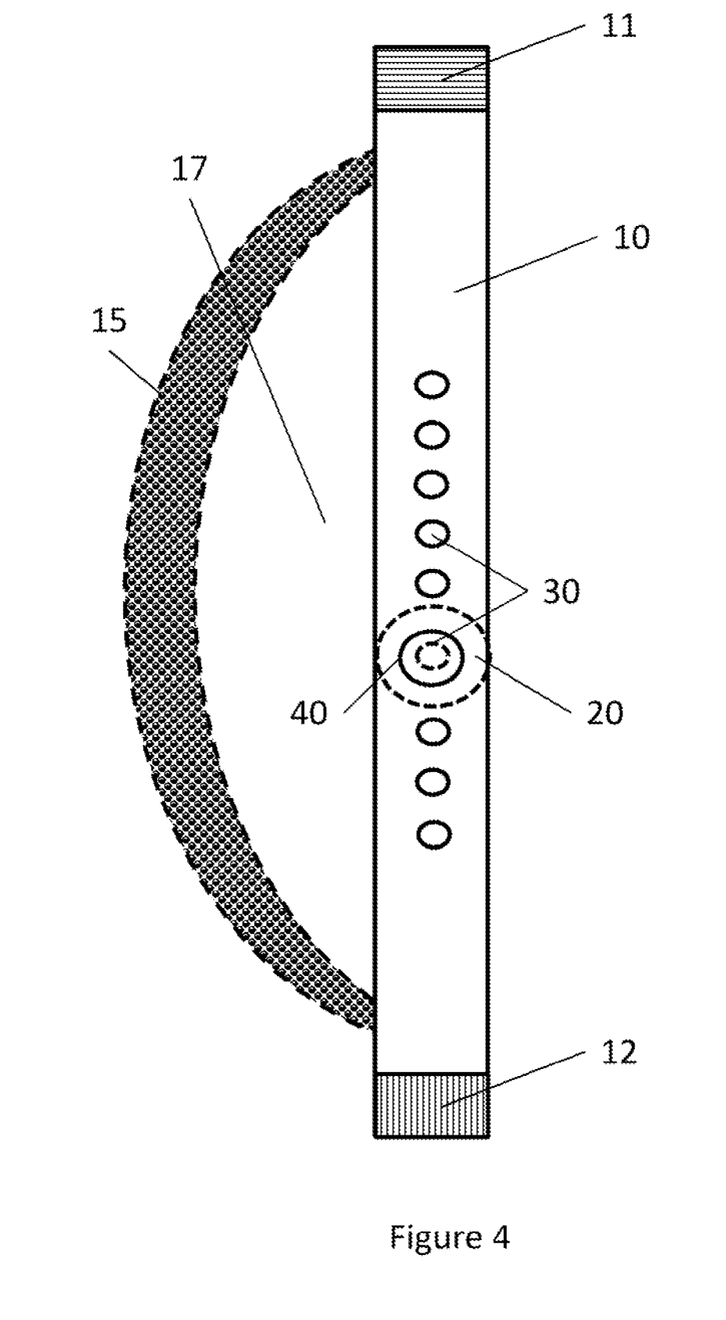
FIG. 4 illustrates another embodiment of a hearing assist restraint device for an animal.

FIG. 4 illustrates another embodiment of a restraint device for an animal for assisting hearing in an animal. As illustrated in FIG. 4, the restraint device includes a first strap 10 that is able to encircle the thorax area of an animal. The first strap 10 includes a bone conduction device 20 that is positioned near the cranium or a bone of the animal.

The first strap 10 also includes attachment devices (interfaces) 11 and 12 to enable the first strap 10 encircle the thorax area of an animal. The attachment devices (interfaces) 11 and 12 may be a hook and latch system, a buckle system, or a snap system.

Furthermore, first strap 10 includes positioning holes (bone conduction attachment sites) 30 for enabling the positioning of the bone conduction device 20 along various locations on the first strap 10 so that the bone conduction device 20 can be positioned near the cranium or a bone of the animal.

The bone conduction device 20 would include a post (not shown) which passes through a positioning hole (bone conduction attachment site) 30. The bone conduction device 20 would be retained in the positioning hole (bone conduction attachment site) 30 using a snap cap 40 that engages the post of the bone conduction device 20 to hold the bone conduction device 20 in place.

The bone conduction collar may also include a second strap 15 for going over the head of the animal to assist in maintaining the bone conduction collar on the animal.

The first strap 10 and the second strap 15 form an opening 17 that allows the ears (not shown) of the animal to pass therethrough. The second strap 15 is positioned near the front or the top of the cranium or a bone of the animal. The first strap 10 is positioned near the back or the bottom of the cranium or a bone of the animal.

Although FIG. 4 illustrates that the positioning holes (bone conduction attachment sites) 30 are located on the first strap 10 so that the bone conduction device 20 can be located on the first strap 10, the positioning holes (bone conduction attachment sites) 30 may be located on the second strap 15 so that the bone conduction device 20 can be located on the second strap 15.

Moreover, although FIG. 4 illustrates that the bone conduction attachment sites 30 are positioning holes, the positioning holes can be replaced with individual small magnets such that the bone conduction device 20 can be magnetically attached to the first strap 10 via either a magnet within or on the bone conduction device 20 or a magnetic metal within or on the bone conduction device 20.

Additionally, the optional positioning holes on the second strap 15 can be replaced with individual small magnets such that the bone conduction device 20 can be magnetically attached to the second strap 15 via either a magnet within or on the bone conduction device 20 or a magnetic metal within or on the bone conduction device 20.

Furthermore, although FIG. 4 illustrates that the bone conduction attachment sites 30 are positioning holes, the positioning holes can be replaced with individual pieces of magnetic metal such that the bone conduction device 20 can be magnetically attached to the first strap 10 via a magnet within or on the bone conduction device 20.

Also, the optional positioning holes on the second strap 15 can be replaced with individual pieces of magnetic metal such that the bone conduction device 20 can be magnetically attached to the second strap 15 via a magnet within or on the bone conduction device 20.

Figure 5:
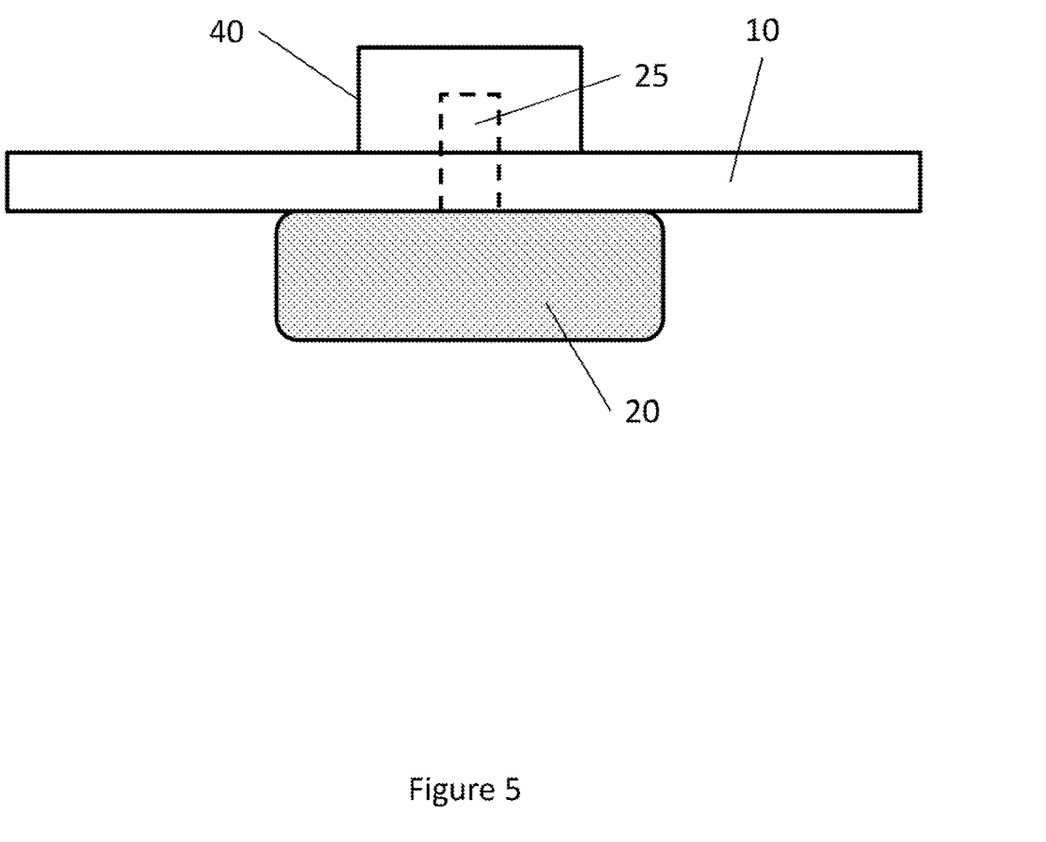
FIG. 5 illustrates a side view of the embodiment of FIG. 4.

FIG. 5 illustrates a side view of the embodiment of FIG. 4. As illustrated in FIG. 5, a first strap 10 includes positioning hole (bone conduction attachment site) (not shown). The bone conduction device 20 includes a post 25 which passes through a positioning hole (bone conduction attachment site) (not shown). The bone conduction device 20 is retained in the positioning hole (bone conduction attachment site) (not shown) using snap cap 40 that engages the post 25 of the bone conduction device 20 to hold the bone conduction device 20 in place.

Although FIG. 5 illustrates that the positioning holes (bone conduction attachment sites) are located on the first strap 10 so that the bone conduction device 20 can be located on the first strap 10, the positioning holes (bone conduction attachment sites) may be located on the second strap 15 so that the bone conduction device 20 can be located on the second strap 15.

Figure 6:
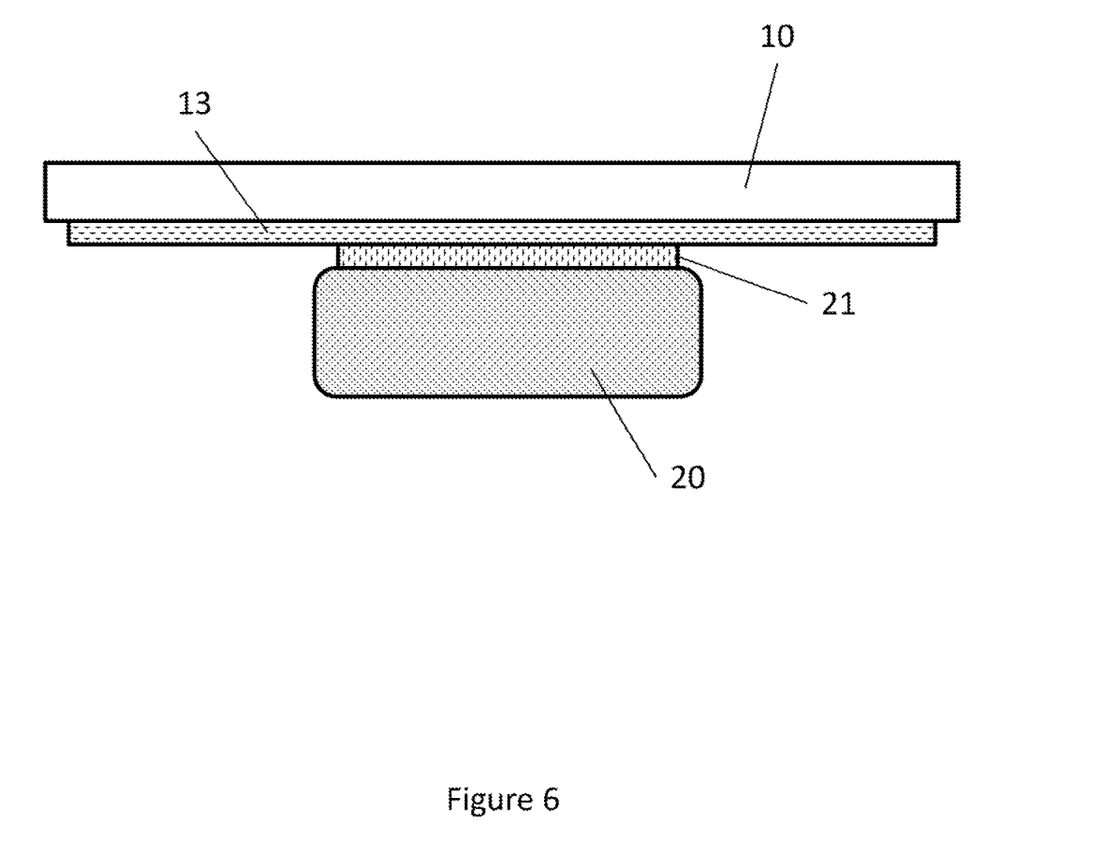
FIG. 6 illustrates another embodiment of a hearing assist restraint device for an animal.

FIG. 6 illustrates another embodiment of a restraint device for an animal for assisting hearing in an animal. As illustrated in FIG. 6, a first strap 10 includes a layer (13) of hooks of a hook and latch system (such as Velcro™). The bone conduction device 20 includes a layer (21) of latches of the hook and latch system. The bone conduction device 20 is retained to the first strap 10, via the hook and latch system, to hold the bone conduction device 20 in place.

It is noted that the layer 13 may be latches and the layer 21 may be hooks to create the hook and latch system.

Although FIG. 6 illustrates that the hook and latch system is positioned with respect to the first strap 10 so that the bone conduction device 20 can be located on the first strap 10, the hook and latch system may be positioned with respect to the second strap 15 so that the bone conduction device 20 can be located on the second strap 15.

Moreover, although FIG. 6 illustrates a hook and latch system, the layer 13 can be replaced with a magnetic strip such that the bone conduction device 20 can be magnetically attached to the first strap 10 via either a magnet within or on the bone conduction device 20 or a magnetic metal within or on the bone conduction device 20.

Additionally, the layer for the optional hook and latch system on the second strap 15 can be replaced with a magnetic strip such that the bone conduction device 20 can be magnetically attached to the second strap 15 via either a magnet within or on the bone conduction device 20 or a magnetic metal within or on the bone conduction device 20.

Furthermore, although FIG. 6 illustrates a hook and latch system, the layer 13 can be replaced with a magnetic metal strip such that the bone conduction device 20 can be magnetically attached to the first strap 10 via a magnet within or on the bone conduction device 20.

Also, the layer for the optional hook and latch system on the second strap 15 can be replaced with a magnetic metal strip such that the bone conduction device 20 can be magnetically attached to the second strap 15 via a magnet within or on the bone conduction device 20.

Figure 7:
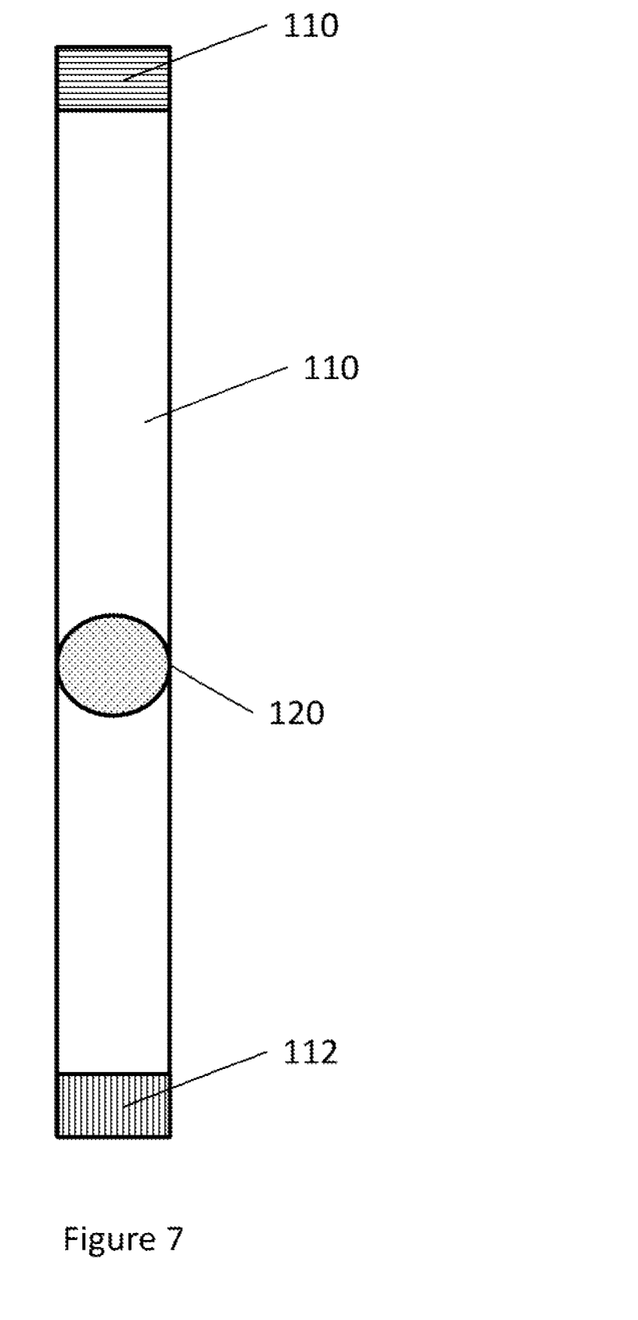
FIG. 7 illustrates another hearing assist restraint device for an animal.

FIG. 7 illustrates a restraint device for an animal for assisting hearing in an animal. As illustrated in FIG. 7, the restraint device includes a first strap 110 that is able to encircle the thorax area of an animal. The first strap 110 includes a bone conduction device 120 that is positioned near the shoulders of the animal or a bone in the thorax area of the animal.

The first strap 110 also includes attachment devices (interfaces) 111 and 112 to enable the first strap 110 encircle the thorax area of an animal. The attachment devices (interfaces) 111 and 112 may be a hook and latch system, a buckle system, or a snap system.

Figure 8:
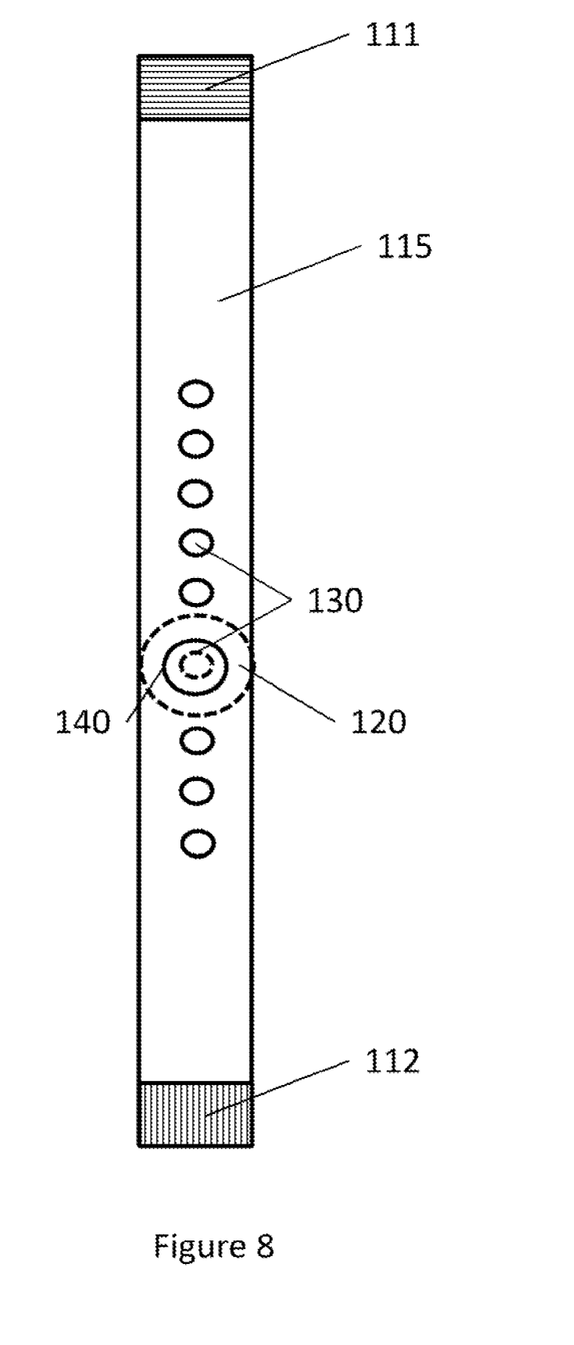
FIG. 8 illustrates another embodiment of a hearing assist restraint device for an animal.

FIG. 8 illustrates another embodiment of a restraint device for an animal for assisting hearing in an animal. As illustrated in FIG. 8, the restraint device includes a first strap 115 that is able to encircle the thorax area of an animal. The first strap 115 includes a bone conduction device 120 that is positioned near the shoulders of the animal or a bone in the thorax area of the animal.

The first strap 115 also includes attachment devices (interfaces) 111 and 112 to enable the first strap 115 encircle the thorax area of an animal. The attachment devices (interfaces) 111 and 112 may be a hook and latch system, a buckle system, or a snap system.

Furthermore, first strap 115 includes positioning holes (bone conduction attachment sites) 130 for enabling the positioning of the bone conduction device 120 along various locations on the first strap 115 so that the bone conduction device 120 can be positioned near the shoulders of the animal or a bone in the thorax area of the animal.

The bone conduction device 120 would include a post (not shown) which passes through a positioning hole (bone conduction attachment site) 130. The bone conduction device 120 would be retained in the positioning hole (bone conduction attachment site) 130 using a snap cap 140 that engages the post of the bone conduction device 120 to hold the bone conduction device 120 in place.

Although FIG. 8 illustrates that the bone conduction attachment sites 130 are positioning holes, the positioning holes can be replaced with individual small magnets such that the bone conduction device 120 can be magnetically attached to the first strap 115 via either a magnet within or on the bone conduction device 120 or a magnetic metal within or on the bone conduction device 120.

Furthermore, although FIG. 8 illustrates that the bone conduction attachment sites 130 are positioning holes, the positioning holes can be replaced with individual pieces of magnetic metal such that the bone conduction device 120 can be magnetically attached to the first strap 115 via a magnet within or on the bone conduction device 120.

Figure 9:
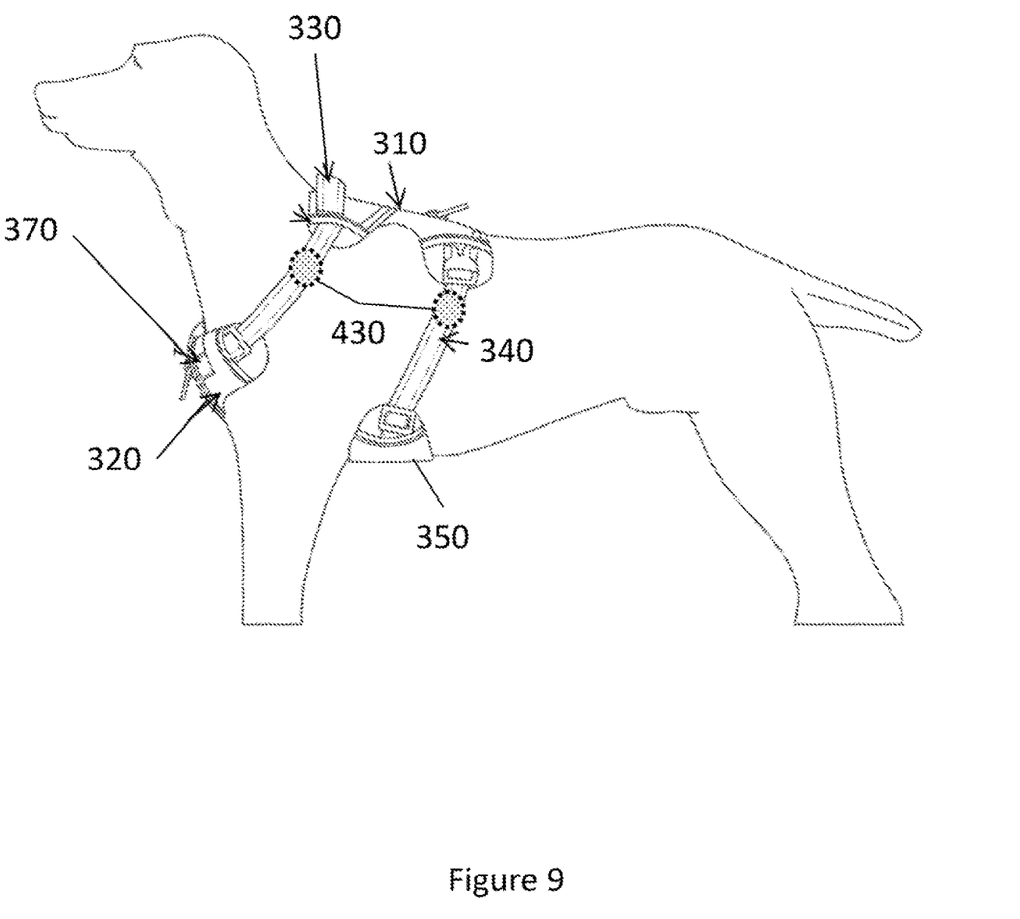
FIG. 9 illustrates another hearing assist restraint device for an animal.

FIG. 9 illustrates another restraint device for assisting hearing in an animal. As illustrated in FIG. 9, the restraint device is a harness that includes a back shoulder section 310, which connects to a chest section 320, via upper 330 strap and lower 340 strap. The back shoulder section 310 is connected to a bottom panel 350 of the harness.

As further illustrated in FIG. 9, a bone conduction device attachment site 430 may be located on the upper 330 strap or the lower 340 strap, such that a bone conduction device (not shown) can be located near a bone of the animal.

Although FIG. 9 illustrates a single bone conduction device attachment site located on the upper 330 strap or the lower 340 strap, there may be multiple bone conduction device attachment sites located on the upper 330 strap or the lower 340 strap to enable proper placement of the bone conduction device (not shown) can be located near a bone of the animal.

It is further noted that back shoulder section 310, chest section 320 and/or bottom panel 350 of the harness may include bone conduction device attachment sites (not shown) to enable proper placement of the bone conduction device (not shown) can be located near a bone of the animal.

Figure 10:
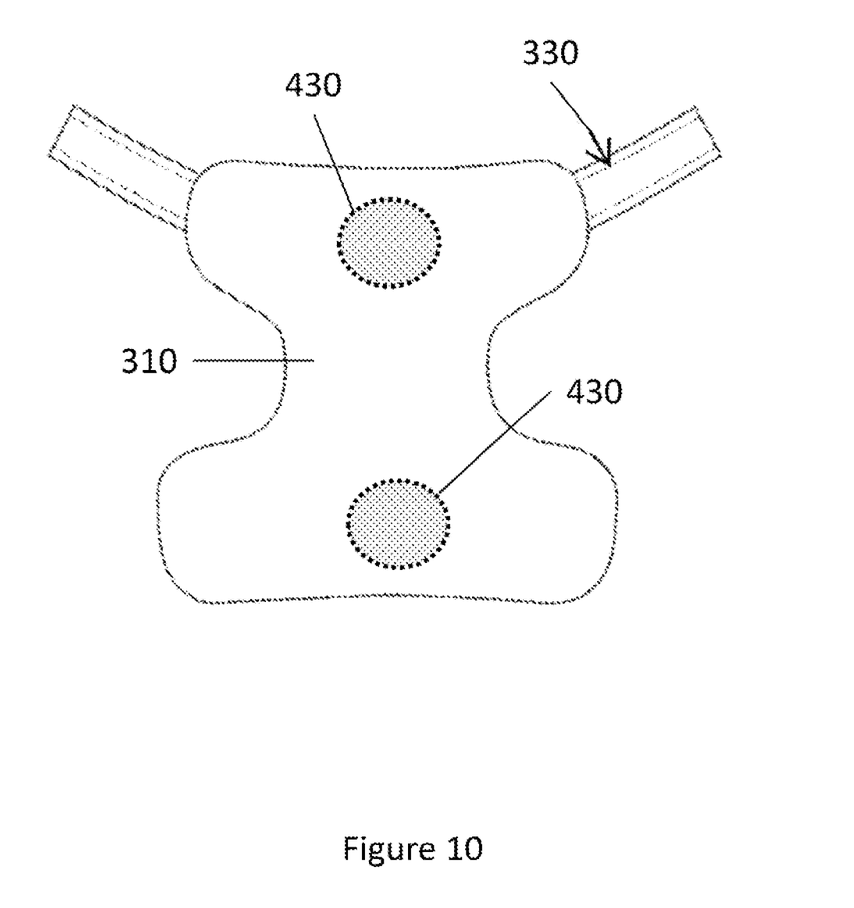
FIG. 10 illustrates additional bone conduction device attachments sites for the hearing assist restraint device of FIG. 9

FIG. 10 illustrates single bone conduction device attachment sites located on a back shoulder section 310 of an animal harness. As illustrated, the harness includes back shoulder section 310 and upper 330 strap. The back shoulder section 310 includes bone conduction device attachment sites 430 such that a bone conduction device (not shown) can be located near a bone of the animal.

The bone conduction device attachment sites may be located at various locations on the back shoulder section 310 to enable proper placement of the bone conduction device (not shown) can be located near a bone of the animal.

In the various embodiments described above, the bone conduction device may be connected to either the first strap or the second strap using a magnetic system, a clip, or other attachment system that allows the bone conduction device to be properly positioned on either the first strap or the second strap such that the bone conduction device is positioned near the cranium or a bone of the animal.

In the various embodiments described above, the bone conduction device may be connected to the restraint device using a magnetic system, a clip, or other attachment system that allows the bone conduction device to be properly positioned on the restraint device such that the bone conduction device is positioned near a bone of the animal.

A restraint device for assisting hearing in an animal comprises a first strap configured to encircle a thorax area of the animal; and a bone conduction device for producing vibration near a bone in the thorax area of the animal; the bone conduction device including, a bone conduction transducer configured to generate vibrations in a frequency range perceivable by the animal, a processor, communicatively coupled to the bone conduction transducer, configured to control the generation of vibrations by the bone conduction transducer, and a microphone, operatively connected to the processor, configured to pick up ambient sounds and convert the picked up ambient sounds to electrical signals; the processor, in response to receiving the electrical signals from the microphone, controlling the bone conduction transducer to generate vibrations in a frequency range corresponding to the picked up ambient sounds.

The restraint device may further comprise a second strap, operatively attached to the first strap; the first strap and the second strap forming an opening configured to allow ears of the animal to pass therethrough.

The bone conduction device may include a transceiver, operatively connected to the processor, configured to receive wireless transducer control signals; the processor, in response to receiving the wireless transducer control signals from the transceiver, controlling the bone conduction transducer to generate vibrations in a frequency range corresponding to the wireless transducer control signals.

The bone conduction device may include a rechargeable power source configured to provide power to electrical components of the bone conduction device; and a charging port, operatively connected to the rechargeable power source, configured to provide electrical power to recharge the rechargeable power source.

The bone conduction device may include a rechargeable power source configured to provide power to electrical components of the bone conduction device; and a resonant magnetic coupling, operatively connected to the rechargeable power source, configured to provide electrical power to recharge the rechargeable power source.

The bone conduction device may include a self-charging battery, having a moveable magnet relative to a wire coil, configured to provide power to electrical components of the bone conduction device.

The first strap may include attachment interfaces configured to enable the first strap to encircle the thorax area of the animal.

The bone conduction device may be attached to the first strap at a location such that the bone conduction device is located near the cranium area or a bone of the animal when the first strap encircles the thorax area of the animal.

The bone conduction device may be attached to the second strap at a location such that the bone conduction device is located near the cranium area or a bone of the animal when the first strap encircles the thorax area of the animal.

The first strap may include bone conduction attachment sites, each bone conduction attachment site being configured to attach the bone conduction device at a different location on the first strap such that the bone conduction device is located near the cranium area or a bone of the animal when the first strap encircles the thorax area of the animal.

The second strap may include bone conduction attachment sites, each bone conduction attachment site being configured to attach the bone conduction device at a different location on the second strap such that the bone conduction device is located near the cranium area or a bone of the animal when the first strap encircles the thorax area of the animal.

The bone conduction device may include a projection; the bone conduction attachment sites being through holes configured to receive the projection.

The restraint device may further comprise a hook and latch system configured to attach the bone conduction device to the first strap.

The restraint device may further comprise a hook and latch system configured to attach the bone conduction device to the second strap.

The restraint device may further comprise a magnet system configured to attach the bone conduction device to the first strap.

The restraint device may further comprise a magnet system configured to attach the bone conduction device to the second strap.

The restraint device may further comprise a remote device configured to transmit transducer control signals to the bone conduction device; the bone conduction device, in response to the transducer control signals, generating a vibration at a frequency range that the animal perceives as being a command.

The bone conduction device may be attached to the first strap at a location such that the bone conduction device is located near a shoulder bone of the animal when the first strap encircles the thorax area of the animal.

The first strap may include bone conduction attachment sites, each bone conduction attachment site being configured to attach the bone conduction device at a different location on the first strap such that the bone conduction device is located near a shoulder bone of the animal when the first strap encircles the thorax area of the animal.

The restraint device may comprise a second strap; a back section operatively connected to the first and second straps; and a chest section operatively connected to the first strap the first strap, the second strap, the back section, and the chest section forming a harness.

The bone conduction device may include a transceiver, operatively connected to the processor, configured to receive wireless transducer control signals; the processor, in response to receiving the wireless transducer control signals from the transceiver, controlling the bone conduction transducer to generate vibrations in a frequency range corresponding to the wireless transducer control signals.

The bone conduction device may include a rechargeable power source configured to provide power to electrical components of the bone conduction device.

The first strap may include attachment interfaces configured to enable the first strap to encircle the thorax area of the animal.

The bone conduction device may be attached to the first strap at a location such that the bone conduction device is located near a bone of the animal when the first strap encircles the thorax area of the animal.

The bone conduction device may be attached to the first strap at a location such that the bone conduction device is located near a shoulder bone of the animal when the first strap encircles the thorax area of the animal.

The bone conduction device may be attached to the first strap at a location such that the bone conduction device is located near a cranium area of the animal when the first strap encircles the thorax area of the animal.

The bone conduction device may be attached to the second strap at a location such that the bone conduction device is located near a cranium area of the animal when the first strap encircles the thorax area of the animal.

The bone conduction device may be attached to the second strap at a location such that the bone conduction device is located near a cranium area of the animal when the first strap encircles the thorax area of the animal.

The first strap may include bone conduction attachment sites, each bone conduction attachment site being configured to attach the bone conduction device at a different location on the first strap such that the bone conduction device is located near a bone of the animal when the first strap encircles the thorax area of the animal.

The back section may include bone conduction attachment sites, each bone conduction attachment site being configured to attach the bone conduction device at a different location on the back section such that the bone conduction device is located near a bone of the animal when the first strap encircles the thorax area of the animal.

The second strap may include bone conduction attachment sites, each bone conduction attachment site being configured to attach the bone conduction device at a different location on the second strap such that the bone conduction device is located near a bone of the animal when the first strap encircles the thorax area of the animal.

The second strap may include bone conduction attachment sites, each bone conduction attachment site being configured to attach the bone conduction device at a different location on the second strap such that the bone conduction device is located near a bone of the animal when the first strap encircles the thorax area of the animal.

The chest section may include bone conduction attachment sites, each bone conduction attachment site being configured to attach the bone conduction device at a different location on the back section such that the bone conduction device is located near a bone of the animal when the first strap encircles the thorax area of the animal.

The restraint device may comprise a hook and latch system configured to attach the bone conduction device to the restraint device.

The restraint device may comprise a magnet system configured to attach the bone conduction device to the first strap.

The restraint device may comprise a magnet system configured to attach the bone conduction device to the restraint device.

The first strap may include a bone conduction attachment site, the bone conduction attachment site being configured such that the bone conduction device is attached to the first strap at a location such that the bone conduction device is located near a bone of the animal when the first strap encircles the thorax area of the animal.

The first strap may include a bone conduction attachment site, the bone conduction attachment site being configured such that the bone conduction device is attached to the first strap at a location such that the bone conduction device is located near a shoulder bone of the animal when the first strap encircles the thorax area of the animal.

The first strap may include a bone conduction attachment site, the bone conduction attachment site being configured such that the bone conduction device is attached to the first strap at a location such that the bone conduction device is located near a cranium area of the animal when the first strap encircles the thorax area of the animal.

The second strap may include a bone conduction attachment site, the bone conduction attachment site being configured such that the bone conduction device is attached to the second strap at a location such that the bone conduction device is located near a cranium area of the animal when the first strap encircles the thorax area of the animal.

The second strap may include a bone conduction attachment site, the bone conduction attachment site being configured such that the bone conduction device is attached to the second strap at a location such that the bone conduction device is located near a cranium area of the animal when the first strap encircles the thorax area of the animal.

A system for assisting hearing in an animal, comprises a restraint device configured to encircle a thorax area of the animal; a bone conduction device for producing vibration near a bone in the thorax area of the animal; and a remote device configured to transmit transducer control signals to the bone conduction device; the bone conduction device including, a bone conduction transducer configured to generate vibrations in a frequency range perceivable by the animal, a processor, communicatively coupled to the bone conduction transducer, configured to control the generation of vibrations by the bone conduction transducer, and a microphone, operatively connected to the processor, configured to pick up ambient sounds and convert the picked up ambient sounds to electrical signals; the processor, in response to receiving the electrical signals from the microphone, controlling the bone conduction transducer to generate vibrations in a frequency range corresponding to the picked up ambient sounds the bone conduction device, in response to the transducer control signals, generating a vibration at a frequency range that the animal perceives as being a command.

The system may comprise a bone conduction attachment site, the bone conduction attachment site being configured to attach the bone conduction device at a location on the restraint device such that the bone conduction device is located near a bone of the animal when the restraint device encircles the thorax area of the animal It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A restraint device for assisting hearing in an animal, comprising:
   a first strap configured to encircle a thorax area of the animal; and
   a bone conduction device for producing vibration near a bone in the thorax area of the animal;
   said bone conduction device including,
      a bone conduction transducer configured to generate vibrations in a frequency range perceivable by the animal,
      a processor, communicatively coupled to said bone conduction transducer, configured to control the generation of vibrations by said bone conduction transducer, and
      a microphone, operatively connected to said processor, configured to pick up ambient sounds and convert the picked up ambient sounds to electrical signals;
   said processor, in response to receiving said electrical signals from said microphone, controlling said bone conduction transducer to generate vibrations in a frequency range corresponding to the picked up ambient sounds.

2. The restraint device, as claimed in claim 1, further comprising:
   a second strap, operatively attached to said first strap;
   said first strap and said second strap forming an opening configured to allow ears of the animal to pass therethrough.

3. The restraint device, as claimed in claim 2, wherein said first strap includes a bone conduction attachment site, said bone conduction attachment site being configured such that said bone conduction device is attached to said first strap at a location such that said bone conduction device is located near a cranium area of the animal when said first strap encircles the thorax area of the animal.

4. The restraint device, as claimed in claim 2, said second strap includes a bone conduction attachment site, said bone conduction attachment site being configured such that said bone conduction device is attached to said second strap at a location such that said bone conduction device is located near a cranium area of the animal when said first strap encircles the thorax area of the animal.

5. The restraint device, as claimed in claim 2, wherein said second strap includes bone conduction attachment sites, each bone conduction attachment site being configured to attach said bone conduction device at a different location on said second strap such that said bone conduction device is located near a bone of the animal when said first strap encircles the thorax area of the animal.

6. The restraint device, as claimed in claim 1, further comprising:
   a second strap;
   a back section operatively connected to said first and second straps; and
   a chest section operatively connected to said first strap
   said first strap, said second strap, said back section, and said chest section forming a harness.

7. The restraint device, as claimed in claim 6, wherein said second strap includes a bone conduction attachment site, said bone conduction attachment site being configured such that said bone conduction device is attached to said second strap at a location such that said bone conduction device is located near a cranium area of the animal when said first strap encircles the thorax area of the animal.

8. The restraint device, as claimed in claim 6, wherein said back section includes bone conduction attachment sites, each bone conduction attachment site being configured to attach said bone conduction device at a different location on said back section such that said bone conduction device is located near a bone of the animal when said first strap encircles the thorax area of the animal.

9. The restraint device, as claimed in claim 6, wherein said second strap includes bone conduction attachment sites, each bone conduction attachment site being configured to attach said bone conduction device at a different location on said second strap such that said bone conduction device is located near a bone of the animal when said first strap encircles the thorax area of the animal.

10. The restraint device, as claimed in claim 6, wherein said chest section includes bone conduction attachment sites, each bone conduction attachment site being configured to attach said bone conduction device at a different location on said back section such that said bone conduction device is located near a bone of the animal when said first strap encircles the thorax area of the animal.

11. The restraint device, as claimed in claim 1, wherein said bone conduction device further includes:
   a transceiver, operatively connected to said processor, configured to receive wireless transducer control signals;
   said processor, in response to receiving said wireless transducer control signals from said transceiver, controlling said bone conduction transducer to generate vibrations in a frequency range corresponding to said wireless transducer control signals.

12. The restraint device, as claimed in claim 1, wherein said bone conduction device further includes a rechargeable power source configured to provide power to electrical components of said bone conduction device.

13. The restraint device, as claimed in claim 1, wherein said first strap includes attachment interfaces configured to enable said first strap to encircle the thorax area of the animal.

14. The restraint device, as claimed in claim 1, wherein said first strap includes a bone conduction attachment site, said bone conduction attachment site being configured such that said bone conduction device is attached to said first strap at a location such that said bone conduction device is located near a bone of the animal when said first strap encircles the thorax area of the animal.

15. The restraint device, as claimed in claim 1, wherein said first strap includes a bone conduction attachment site, said bone conduction attachment site being configured such that said bone conduction device is attached to said first strap at a location such that said bone conduction device is located near a shoulder bone of the animal when said first strap encircles the thorax area of the animal.

16. The restraint device, as claimed in claim 1, wherein said first strap includes bone conduction attachment sites, each bone conduction attachment site being configured to attach said bone conduction device at a different location on said first strap such that said bone conduction device is located near a bone of the animal when said first strap encircles the thorax area of the animal.

17. The restraint device, as claimed in claim 1, further comprising:
   a hook and latch system configured to attach said bone conduction device to the restraint device.

18. The restraint device, as claimed in claim 1, further comprising:
   a magnet system configured to attach said bone conduction device to the restraint device.

19. A system for assisting hearing in an animal, comprising:
   a restraint device configured to encircle a thorax area of the animal;
   a bone conduction device for producing vibration near a bone in the thorax area of the animal; and
   a remote device configured to transmit transducer control signals to said bone conduction device;
   said bone conduction device including,
      a bone conduction transducer configured to generate vibrations in a frequency range perceivable by the animal,
      a processor, communicatively coupled to said bone conduction transducer, configured to control the generation of vibrations by said bone conduction transducer, and
      a microphone, operatively connected to said processor, configured to pick up ambient sounds and convert the picked up ambient sounds to electrical signals;
   said processor, in response to receiving said electrical signals from said microphone, controlling said bone conduction transducer to generate vibrations in a frequency range corresponding to the picked up ambient sounds
   said bone conduction device, in response to said transducer control signals, generating a vibration at a frequency range that the animal perceives as being a command.

20. The system, as claimed in claim 19, further comprising:
   a bone conduction attachment site, said bone conduction attachment site being configured to attach said bone conduction device at a location on said restraint device such that said bone conduction device is located near a bone of the animal when said restraint device encircles the thorax area of the animal.

* * * * *